US010609236B2

(12) United States Patent
Miyahara et al.

(10) Patent No.: US 10,609,236 B2
(45) Date of Patent: Mar. 31, 2020

(54) IMAGE FORMING APPARATUS AND RECORDING MEDIUM SUITABLE FOR IMAGE FORMING PROCESS

(71) Applicant: KYOCERA Document Solutions Inc., Osaka (JP)

(72) Inventors: Norifumi Miyahara, Osaka (JP); Kunihiko Shimamoto, Osaka (JP); Satoshi Hayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/221,479

(22) Filed: Dec. 15, 2018

(65) Prior Publication Data

US 2019/0191046 A1     Jun. 20, 2019

(30) Foreign Application Priority Data

Dec. 15, 2017    (JP) ................................ 2017-241006

(51) Int. Cl.
*H04N 1/00*      (2006.01)
*H04N 1/12*      (2006.01)
(Continued)

(52) U.S. Cl.
CPC ....... *H04N 1/00596* (2013.01); *H04N 1/0023* (2013.01); *H04N 1/1205* (2013.01);
(Continued)

(58) Field of Classification Search
None
See application file for complete search history.

(56) References Cited

U.S. PATENT DOCUMENTS

2006/0203280 A1*   9/2006   Kobayashi ............. G06K 15/02
                                                                                           358/1.14
2013/0293930 A1   11/2013   Araki et al.
(Continued)

FOREIGN PATENT DOCUMENTS

JP         2013-236159 A     11/2013

*Primary Examiner* — Frantz Bataille
(74) *Attorney, Agent, or Firm* — Hawaii Patent Services; Nathaniel K. Fedde; Kenton N. Fedde

(57) ABSTRACT

Provided is an image forming apparatus that suppresses degradation of performance of processing up to completion of printing while suppressing the occurrence of moire. A data-compression unit stores identification data indicating the presence or absence of periodicity obtained by analyzing printing data, and printing data correlated with the identification data in a first memory area of a RAM. A color-conversion-processing unit that performs a speculative process, causes printing data that has undergone a color conversion process corresponding to printer printing to be stored in a second memory area of a RAM. A screen-processing unit that performs a speculative process, performs an AM screen process on printing data. In addition, a system-control unit causes the image-forming unit to move from a printing pre-start position to a printing start position based on a determination result of a printing color in a color conversion process corresponding to a first printer printing by the color-conversion-processing unit by a speculative process.

3 Claims, 6 Drawing Sheets

(51) Int. Cl.
*H04N 1/23* (2006.01)
*H04N 1/405* (2006.01)
*H04N 1/52* (2006.01)

(52) U.S. Cl.
CPC .......... *H04N 1/233* (2013.01); *H04N 1/2323* (2013.01); *H04N 1/405* (2013.01); *H04N 1/52* (2013.01); *H04N 2201/0091* (2013.01)

(56) References Cited

U.S. PATENT DOCUMENTS

2015/0367661 A1* 12/2015 Nishikawa ............... B41J 29/38
347/9
2017/0064151 A1* 3/2017 Nagai .................. H04N 1/6072

* cited by examiner

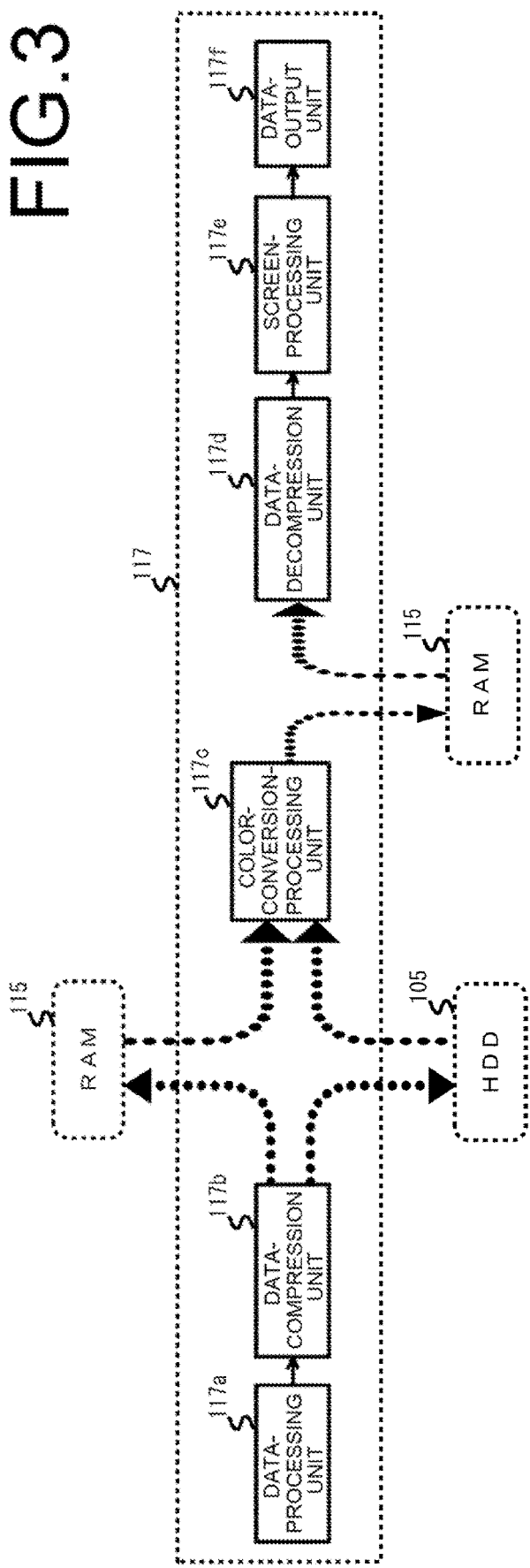

(MONOCHROME PRINTING)

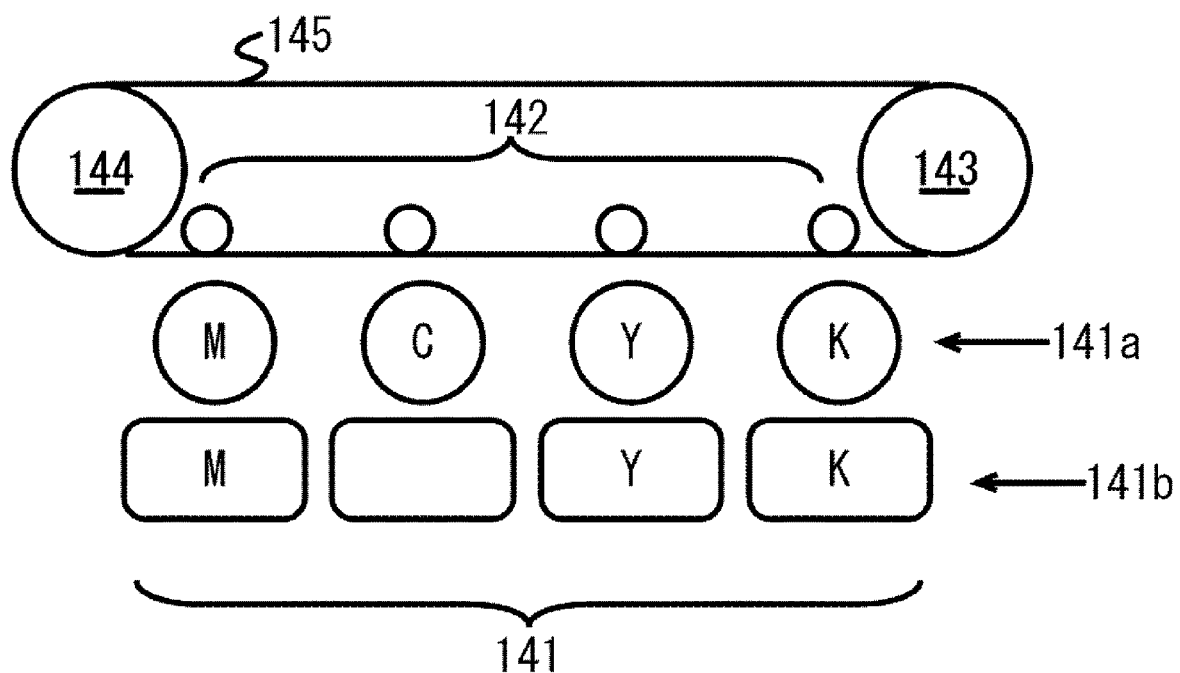
(COLOR PRINTING) FIG.4B

IMAGE FORMING APPARATUS AND RECORDING MEDIUM SUITABLE FOR IMAGE FORMING PROCESS

INCORPORATION BY REFERENCE

This application is based on and claims the benefit of priority from Japanese Patent Application No. 2017-241006 filed on Dec. 15, 2017, the contents of which are hereby incorporated by reference.

BACKGROUND

The present disclosure relates to an image forming apparatus and a recording medium suitable for an image forming process.

For example, in an image forming apparatus such as an MFP (Multifunction Peripheral) or the like, in order to reproduce a halftone, a method of expressing gradation of an image such as an AM screen process as amplitude modulation method or a FM screen process as a frequency modulation method is used.

Incidentally, an AM screen is a screen that expresses gradation by changing the sizes of regularly arranged halftone dots, and is generally used for printer printing in many cases. On the other hand, a FM screen is a screen that expresses the gradation by the density of small halftone dots randomly arranged, and is generally used for copy printing in many cases.

Incidentally, by using an AM screen, even though it is possible to express the shade of color by changing the size of the halftone dots, interference fringes (hereinafter referred to as moire) may occur in the image due to the regularity of halftone dots. On the other hand, since the halftone dots have no regularity in a FM screen, it is difficult for moire to occur, and high-level technology is required for management of minute halftone dots.

Here, as a technique for suppressing the occurrence of moire, in a typical technique, there is an image forming apparatus in which when a reading unit reads an image of a document as document image data, a control unit switches the image processing method of image data that is overwritten on the document based on the document image data.

SUMMARY

The image forming apparatus according to the present disclosure includes an image-processing unit, a storage device, a printer unit, and a system-control unit. The image-processing unit performs image processing on first printing data. The storage device stores second printing data that has undergone image processing by the image-processing unit. The printer unit has an image-forming unit for performing printing based on second printing data stored in the storage device. The system-control unit controls moving between a printing pre-start position and a printing start position of the image-forming unit. The image-processing unit has a first data-processing unit, a second data-processing unit, a color-conversion-processing unit, a screen-processing unit, and a data-output unit. The first data-processing unit converts the first printing data into bitmap third printing data. The second data-processing unit determines the presence or absence of periodicity of an image corresponding to the third printing data. The color-conversion-processing unit, by a speculative process in parallel with processing by the second data processing unit, generates fourth printing data that has undergone a color conversion process corresponding to printer printing on the third printing data. The screen-processing unit, by a speculative process in parallel with processing by the second data processing unit, performs an AM screen process on the fourth printing data. The data-output unit outputs the printing data screen-processed by the screen-processing unit to the printer unit as the second printing data. The screen-processing unit, in the case where it is determined by the second data-processing unit that the third printing data has periodicity, instructs the color-conversion-processing unit to perform a color conversion process corresponding to copy printing on the third printing data, and performs a FM screen process on printing data on which the color conversion process corresponding to the copy printing has been performed. The color-conversion-processing unit determines a printing color based on the fourth printing data. The system-control unit causes the image-forming unit corresponding to the printing color to move from the printing pre-start position to the printing start position based on a determination result of the printing color in the color conversion process corresponding to printer printing by the color-conversion-processing unit, and does not perform control of movement based on the determination result of the printing color in a re-color conversion process corresponding to the copy printing by the color-conversion-processing unit.

The recording medium according to the present disclosure is a non-transitory computer-readable recording medium for storing an image forming program executable on a computer for controlling an image forming apparatus. The computer, when executing the image forming program, by an image-processing unit, performs image processing on first printing data. The computer, by a storage device, stores second printing data that has undergone image processing by the image-processing unit. The computer, by a printer unit, performs printing based on second printing data stored in the storage device. Furthermore, the image-processing unit, by a first data-processing unit, converts the first printing data into bitmap third printing data. The image-processing unit, by a second data-processing unit, determines the presence or absence of periodicity of an image corresponding to the third printing data. The image-processing unit, by a color-conversion-processing unit that performs a speculative process in parallel with processing by the second data processing unit, generates fourth printing data that has undergone a color conversion process corresponding to printer printing on the third printing data. The image-processing unit, by a screen-processing unit that performs a speculative process in parallel with processing by the second data processing unit, performs an AM screen process on the fourth printing data. The image-processing unit, by a data-output unit, outputs the printing data screen-processed by the screen-processing unit to the printer unit as the second printing data. Furthermore, the screen-processing unit, in the case where it is determined by the second data-processing unit that the third printing data has periodicity, instructs the color-conversion-processing unit to perform a color conversion process corresponding to copy printing on the third printing data, and performs a FM screen process on printing data on which the color conversion process corresponding to the copy printing has been performed; the color-conversion-processing unit determines a printing color based on the fourth printing data; and the system-control unit causes the image-forming unit corresponding to the printing color to move from the printing pre-start position to the printing start position based on a determination result of the printing color in the color conversion process corresponding to printer printing by the color-conversion-processing unit, and does not perform control of movement based on the determination result of the printing color in a re-color conversion process corresponding to the copy printing by the color-conversion-processing unit.

BRIEF DESCRIPTION OF THE DRAWINGS

FIG. 3 is a diagram for explaining an example of configuration of the image-processing unit in FIG. 2.

FIG. 4B illustrates the image-forming unit of the MFP in FIG. 1, and is a diagram for explaining the image-forming unit in the case of color printing.

DETAILED DESCRIPTION

Hereinafter, an embodiment of the image forming apparatus according to the present disclosure will be described with reference to FIG. 1 to FIG. 5. Incidentally, as example of the image forming apparatus in the following description is a multifunction peripheral (MFP), which is a complex peripheral apparatus equipped with a printing function, a copying function, a FAX function, a data transmitting/receiving function via a network, and the like.

Figure 1:
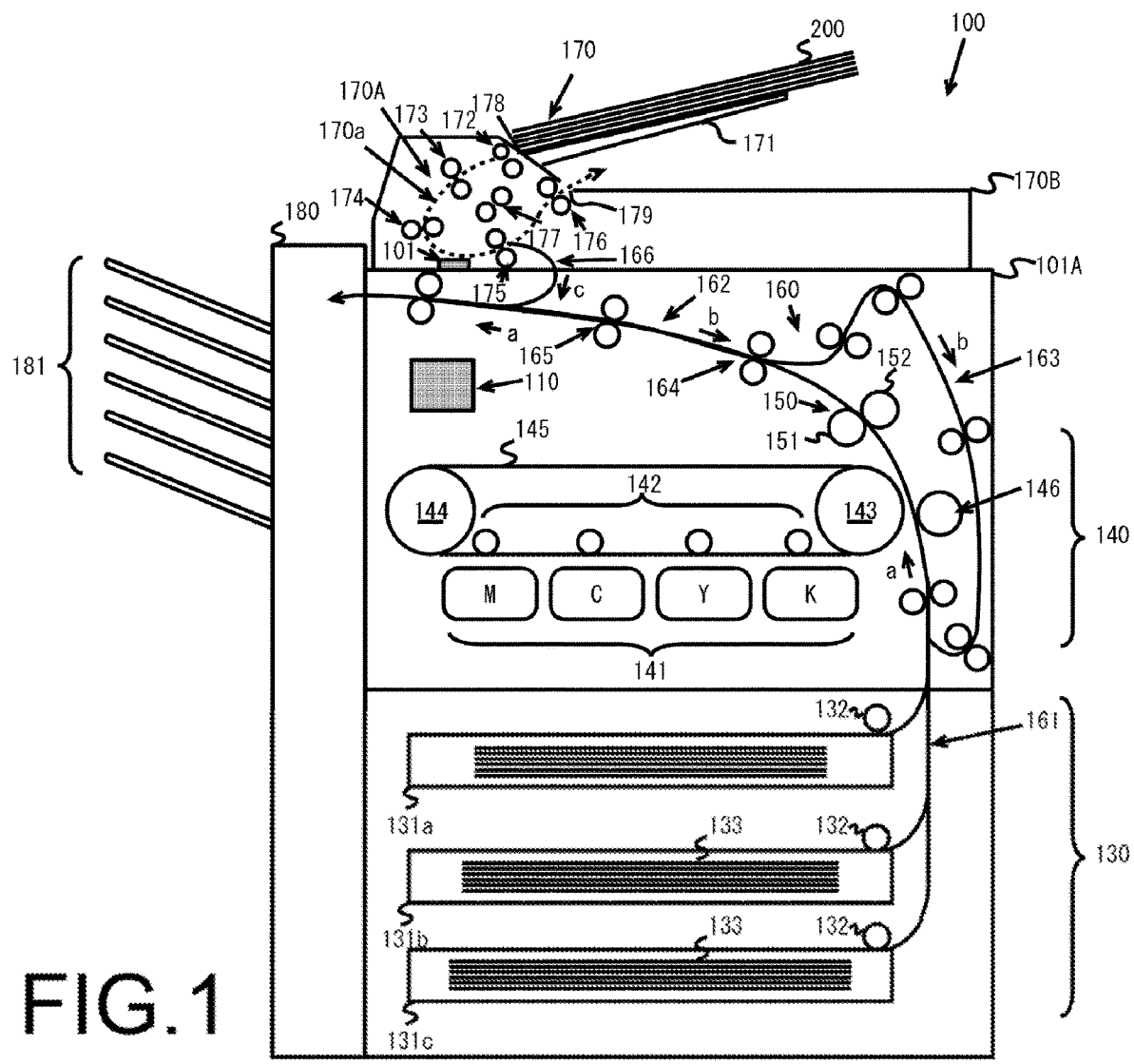
FIG. 1 is a diagram for explaining an embodiment in the case where the image forming apparatus according to the present disclosure is applied to an MFP.

First, as illustrated in FIG. 1, a scanner unit 101, a control unit 110, a paper-supply unit 130, a printer unit 140, a fixing unit 150, a conveying unit 160, and the like are mounted inside the main body 101A of the MFP 100. Incidentally, reference number 170 represents an ADF (Auto Document Feeder) having a paper-supply tray 171, and reference number 180 represents a mailbox having a plurality of paper-discharge trays 181.

The scanner unit 101, for example, as will be explained in detail later, reads images on the front side and the back side of a printed paper 200 that is automatically fed from the ADF 170, for example. In addition, the printed paper 200 may be stored, for example, in the lower paper-supply cassette 131c and fed from the paper-supply cassette 131c. In this case, the scanner unit 101 reads the image on the front side of the printed paper 200 conveyed by a first conveyance path 161 that is described later, and further conveyed by a second conveyance path 162, and then on a third conveyance path 163 reads the image on the back side of the inverted printed paper 200.

The control unit 110 controls the operation of each unit, which will be described later in detail. The paper-supply unit 130 accommodates a plurality of paper-supply cassettes 131a to 131c capable of accommodating various kinds of paper 133 having different paper sizes and paper types. Incidentally, for the paper-supply cassettes 131a to 131c, the lower paper-supply cassette 131c, for example, can be set for printed paper 200, and the upper paper-supply cassette 131a and the middle paper-supply cassette 131b can be set for blank paper 133. Moreover, in each of the paper-supply cassettes 131a to 131c, a paper-supply roller 132 is provided. The paper-supply roller 132 sends out the paper 133 from the paper-supply cassettes 131a to 131c to a first conveyance path 161 of the conveying unit 160, which will be described later.

The printer unit 140 includes an image-forming unit 141 having a photosensitive drum, a developing device, a charging device, a exposing device and the like, and includes magenta (M), cyan (C), yellow (Y), and black (K) ink. In addition, the printer unit 140 has a primary transfer roller 142, a driving roller 143, a driven roller 144, an intermediate-transfer belt 145, and a secondary transfer roller 146. The image-forming unit 141 forms a toner image on the photosensitive drum by charging, exposing and developing processes based on printing data. Moreover, the primary transfer roller 142 transfers the toner image on the photosensitive drum onto the intermediate-transfer belt 145 that is stretched around the driving roller 143 and the driven roller 144. The secondary transfer roller 146 presses against the back side of the paper 133 and transfers the toner image on the intermediate-transfer belt 145 to the front side of the paper 133.

The fixing unit 150 has a heating roller 151 and a pressure roller 152. The heating roller 151 applies heat from a heat source controlled by a heat-source-control unit to the paper 133. The pressure roller 152 presses the paper 133 toward the heating roller 151. The pressure force of the pressure roller 152 is adjusted by a pressure-adjustment-mechanism unit. Then, the fixing unit 150 applies the pressure by the pressure roller 152 and the heat from the heating roller 151 to the paper 133 onto which the toner image has been transferred by the driving roller 143 and the secondary transfer roller 146. As a result, the toner image is fixed on the paper 133. Note that the pressure-adjustment-mechanism unit includes a driving unit such as a pressing member, a spring, a stepping motor, or the like that presses the pressure roller 152 in the direction of the heating roller 151, and by operating the driving unit and moving the pressing member, the pressure force of the pressure roller 152 is adjusted.

The conveying unit 160 has a first conveyance path 161 that is continuous from the paper-supply cassettes 131a to 131c to a branching point 164. The conveying unit 160 has a second conveyance path 162 that is continuous from the branching point 164 to the mailbox 180. The conveying unit 160 has a third conveyance path 163 that branches off at the branching point 164 and returns to the first conveyance path 161. The conveying unit 160 has a fourth conveyance path 166 that is continuous from the ADF 170 to the second conveyance path 162. Incidentally, the first conveyance path 161 and the second conveyance path 162 are used for single-sided printing. Moreover, the third conveyance path 163 is used for double-sided printing.

Here, in single-sided printing, the first conveyance path 161 conveys the paper 133 along the direction of the arrow "a" to the transfer position in the printer unit 140 of the toner image, and conveys the paper 133 to the fixing unit 150 side according to the transfer speed of the toner image. Furthermore, the first conveyance path 161 conveys the paper 133 to the fixing position in the fixing unit 150 of the toner image, and conveys the paper 133 on which the toner image is fixed to the second conveyance path 162 side. Then, the second conveyance path 162 conveys the paper 133 on which the toner image is fixed along the direction of the arrow "a" to the mailbox 180 side.

In double-sided printing, the first conveyance path 161 conveys the paper 133 in the direction of the arrow "a" to the transfer position in the printer unit 140 of the toner image, and conveys the paper 133 to the fixing unit 150 side in accordance with the transfer speed of the toner image.

Furthermore, the first conveyance path 161 conveys the paper 133 to the fixing position in the fixing unit 150 of the toner image, and conveys the paper 133 on which the toner image is fixed to the second conveyance path 162 side. Continuing, the second conveyance path 162 conveys the paper 133 on which the toner image is fixed along the direction of the arrow "a" to the mailbox 180 side, however, when the trailing end of the paper 133 reaches the branching point 164, the third conveyance path 163 conveys the paper 133 along the direction of the arrow "b" and conveys the paper 133 to the first conveyance path 161. At this time, the paper 133 is inverted. In other words, the back side on which no image is formed is directed toward the intermediate-transfer belt 145 side. After that, similar to single-sided printing, the second conveyance path 162 conveys the paper 133 on which the toner image is transferred and fixed along the direction of the arrow "a" to the mailbox 180 side. In the case of single-sided printing and double-sided printing, any one of the paper-supply cassettes 131a to 131c accommodating the blank paper 133 can be selected.

The ADF 170 has a plurality of conveying rollers 172 to 177 arranged inside the main body 170B. Further, the main body 170B is provided with a paper-supply port 178 and a discharge port 179. A plurality of sheets of printed paper 200, for example, can be set in the paper-supply tray 171. Moreover, for example, the sheets of printed paper 200 set in the paper-supply tray 171 are separated one by one by a separating mechanism. Incidentally, as a separating mechanism, a soccer method, a friction method, or the like can be adopted.

The conveying rollers 172 to 176 are arranged along a conveyance path 170a of printed paper 200, for example, indicated by a dotted line as illustrated in FIG. 1. The conveying roller 177 is arranged along a conveyance path of the printed paper 200. Moreover, the printed paper 200 that is conveyed along the conveyance path of printed paper 200, for example, is conveyed along a fourth conveyance path 166, and then is conveyed to the second conveyance path 162 side. Here, the conveying rollers 176, 177, 173 constitute a switchback mechanism 170A. Incidentally, the arrangement of the conveying rollers 172 to 177 is different for each model and may be arbitrarily changed. In addition, the switchback mechanism 170A constituted by the conveying rollers 176, 177, 173 is also different for each model, and may be arbitrarily changed.

The mailbox 180, under the control of the control unit 110, sorts the printed paper 200, for example, into a paper-discharge tray 181 specified according to the size of the margin of the paper 200.

Figure 2:
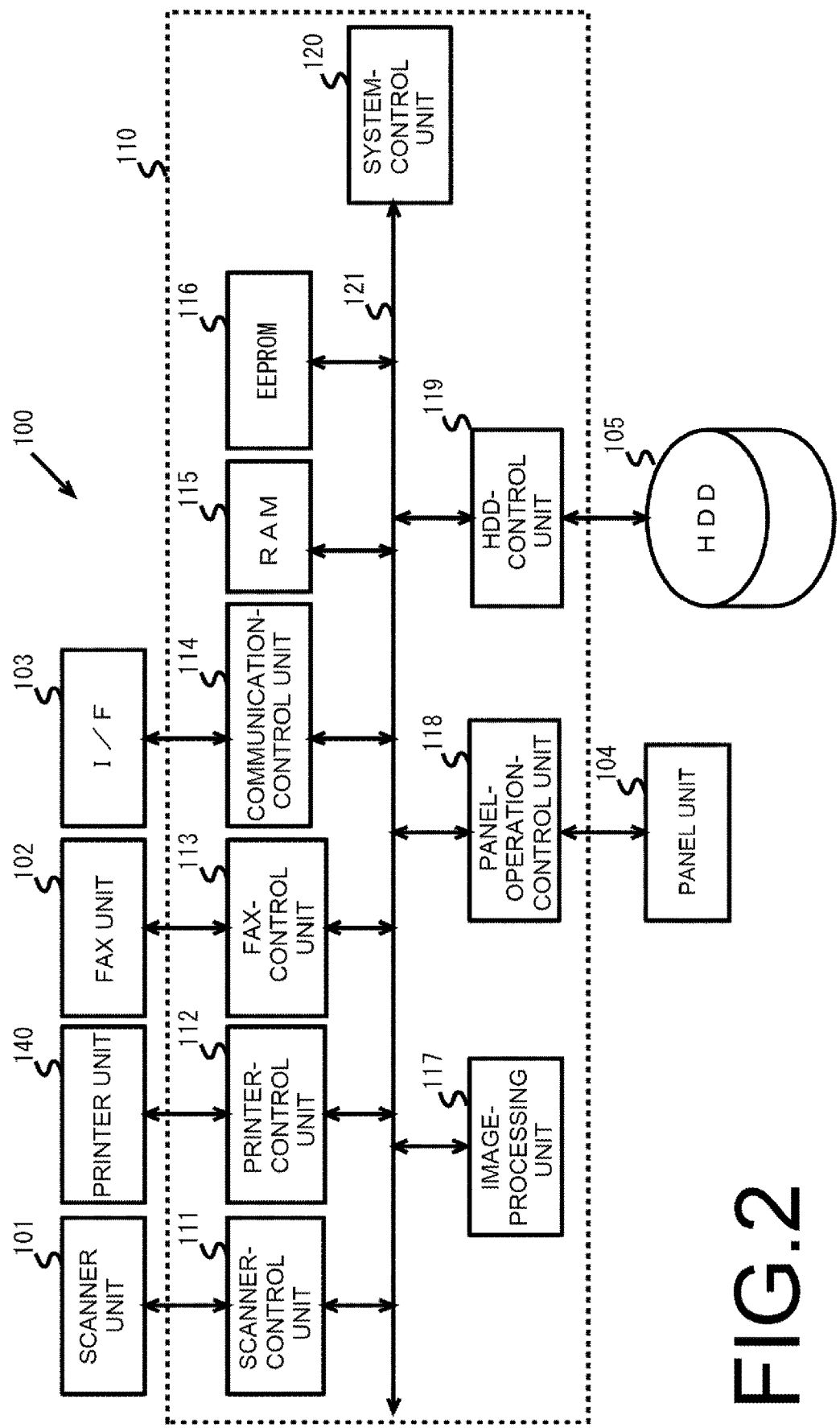
FIG. 2 is a diagram for explaining a configuration of the MFP in FIG. 1.

Next, the configuration of the control unit 110 in FIG. 1 will be described with reference to FIG. 2. The control unit 110 controls operations of the scanner unit 101, the printer unit 140, the facsimile (FAX) unit 102, the interface (I/F) 103, the panel unit 104, and the HDD 105.

The scanner unit 101, for example, is a device that converts an image on a printed paper 200 read by an image sensor into digital image data and inputs the image data to the control unit 110. The printer unit 140 is a device that prints an image on a blank paper 133 or the like based on printing data outputted from the control unit 110. The FAX unit 102 is a device that transmits the data outputted from the control unit 110 to a facsimile of another party via a telephone line, and receives data from a facsimile of another party and inputs the data to the control unit 110.

The I/F 103 is in charge of communication with other MFPs 100, user terminals, and the like via a network. Note that the I/F 103 may also be in charge of communication with a content server, a web server, or the like. The panel unit 104 is, for example, a device having a touch panel and a hardware key for performing a print function, a copy function, a FAX function, a data transmitting/receiving function via a network, and a display for various settings of the MFP 100. The HDD 105 is a storage device that stores application programs and the like for providing various functions of the MFP 100. In addition, the HDD 105 has a user box for storing printing jobs registered from the user terminal side.

The control unit 110 is a processor that controls the overall operation of the MFP 100 by executing an application program such as an authentication program or the like, an image forming program, a control program, and the like. The control unit 110 includes a scanner-control unit 111, a printer-control unit 112, a FAX-control unit 113, a communication-control unit 114, a RAM (Random Access Memory) 115, an EEPROM (electrically erasable and programmable read-only memory) 116, an image-processing unit 117, a panel-operation-control unit 118, an HDD-control unit 119, and a system-control unit 120. In addition, these units are connected to a data bus 121.

The scanner-control unit 111 controls the reading operation of the scanner unit 101. The printer-control unit 112 controls the printing operation of the printer unit 140. The FAX-control unit 113 controls the data transmission/reception operation by the FAX unit 102. The communication-control unit 114, via the I/F 103, controls transmission and reception of data and the like via the network. The RAM 115 is a work memory for executing programs. In addition, the RAM 115 is a storage device that stores printing data that has undergone screen processing (described later) and image processing (rasterization) by the image-processing unit 117. The EEPROM 116 stores a control program for checking the operation of each unit, generating a startup sequence, and the like.

Although described in detail later, the image-processing unit 117 performs image processing (rasterization, screen processing, and the like) on the image data read by the scanner unit 101. In addition, the image-processing unit 117 performs image processing (rasterization, screen processing, and the like) on a printing job registered in the user box of the HDD 105. Incidentally, the system-control unit 120 temporarily stores the printing data that has undergone image processing (rasterization, screen processing, and the like) by the image-processing unit 117 in the RAM 115. The panel-operation-control unit 118 controls the display operation of the panel unit 104. In addition, the panel-operation-control unit 118 receives instructions such as for settings or the like via the panel unit 104.

The HDD-control unit 119 controls reading, writing, and the like of data to and from the HDD 105. The system-control unit 120 controls cooperative operation of each unit and the like. In addition, when there is a printing instruction via the panel unit 104, for example, the system-control unit 120 instructs the image-processing unit 117 and the printer-control unit 112 to print.

Next, an example of the configuration of the image-processing unit 117 will be described with reference to FIG. 3. Note that in image processing by the image-processing unit 117, an AM screen process as amplitude modulation method or a FM screen process as a frequency modulation method is executed in order to reproduce halftones. Incidentally, an AM screen is a screen that expresses gradation by changing the sizes of regularly arranged dots, and is generally used for printer printing in many cases. On the other hand, a FM screen expresses gradation with the density of small points arranged randomly, and is generally used for copy printing in many cases. Hereinafter, the image-processing unit 117 will be described as basically performing screen processing by an AM screen for printer printing. Moreover, it is presumed that the printing data processed by the following data-processing unit 117a is an intermediate language obtained by analyzing printing information indicated by PDL (Page Description Language), for example. Furthermore, the following color-conversion-processing unit 117c, data-decompression unit 117d, and screen-processing unit 117e execute speculative processing in parallel with the processing by the data-processing unit 117a and data-compression unit 117b, however each process will be explained in a step-by-step manner.

First, the image-processing unit 117 has a data-processing unit 117a, a data-compression unit 117b, a color-conversion-processing unit 117c, a data-decompression unit 117d, a screen-processing unit 117e, and a data-output unit 117f.

The data-processing unit 117a, for example, converts printing data that includes characters, images, and the like indicated by an intermediate language into bitmap printing data. The data-compression unit 117b compresses the printing data converted by the data-processing unit 117a and stores it in a first memory area of the RAM 115 and the HDD 105. Incidentally, printing data stored in the first memory area of the RAM 115 is read out and a color conversion process is performed by the color-conversion processing unit 117c in a later stage when it becomes necessary in the later stage for the screen-processing unit 117e to switch from an AM screen to a FM screen. This will be described in detail later. On the other hand, printing data stored in the first memory area of the HDD 105 is read out and a color conversion process is performed by the color-conversion-processing unit 117c in a later stage. This is the case, for example, when printing data requiring a re-color conversion process by the color-conversion processing unit 117c is not stored in the first memory area of the RAM 115.

In addition, the data-compression unit 117b analyzes whether there is periodicity in an image corresponding to compressed printing data for each page, and correlates the printing data for each page with identification data indicating whether or not there is periodicity. Here, the periodicity of data can be analyzed according to the arrangement of pixels based on bitmap data processed by the data processing unit 117a, or according to the arrangement of pixels based on specific bitmap data such as shading or the like. Moreover, the data-compression unit 117b stores the identification data correlated with the printing data for each page in the first memory area of the RAM 115 and the HDD 105.

Here, the color-conversion-processing unit 117c, the data-decompression unit 117d, and the screen-processing unit 117e execute speculative processing in parallel with the processing by the data-processing unit 117a and the data-compression unit 117b. In other words, the color-conversion-processing unit 117c reads the printing data of one page compressed by the data-compression unit 117b from the first memory area of the RAM 115, decompresses the bitmap printing data, and executes a color conversion process on that bitmap printing data. At this time, in the case of printer printing, as a color conversion process corresponding to printer printing, the color-conversion-processing unit 117c executes a color conversion process using a printer color table. In addition, the color-conversion-processing unit 117c compresses printing data that has undergone the color conversion process, and stores the compressed printing data in a second memory area of the RAM 115. Incidentally, the color-conversion-processing unit 117c reads out printing data that is stored in the first memory area of the RAM 115 by the data-compression unit 117b when it becomes necessary for the screen-processing unit 117e to switch from an AM screen to a FM screen in a later stage. Then, as the color conversion process corresponding to copy printing, the color conversion process is performed using a color table for copying, then printing data that has undergone the color conversion process is compressed and stored in the second memory area of the RAM 115.

The data-decompression unit 117d reads and decompresses printing data that has undergone the color conversion process and been compressed from the second memory area of the RAM 115. The screen-processing unit 117e performs a screen process on the color-converted printing data decompressed by the data-decompression unit 117d. Here, the screen-processing unit 117e executes the screen process by an AM screen on the color-converted printing data decompressed by the data-decompression unit 117d. In addition, the screen-processing unit 117e confirms the identification data indicating the presence or absence of periodicity that is correlated with one page of data that is compressed and stored in the first memory area of the RAM 115 by the data-compression unit 117b. After confirming that there is no periodicity, the screen-processing unit 117e sends the printing data that has been screen-processed by the AM screen to the data-output unit 117f in a later stage.

On the other hand, after confirming that there is periodicity, the screen-processing unit 117e instructs the color-conversion-processing unit 117c to perform a re-color conversion process. In this case, the screen-processing unit 117e discards the printing data that has been screen-processed by the AM screen. In addition, the screen processing unit 117e performs screen processing by the FM screen on the printing data on which the color-conversion-processing unit 117c has performed the re-color conversion process. Then, the screen-processing unit 117e sends the printing data that has been screen-processed by the FM screen to the data-output unit 117f in the later stage. The data-output unit 117f performs processing such as enlargement/reduction, rotation, and the like on the printing data that has been screen-processed by the screen processing unit 117e, converts it into final drawing data, and outputs the data. Incidentally, the screen-processing unit 117e may confirm the identification data during the screen process.

Figure 4A:
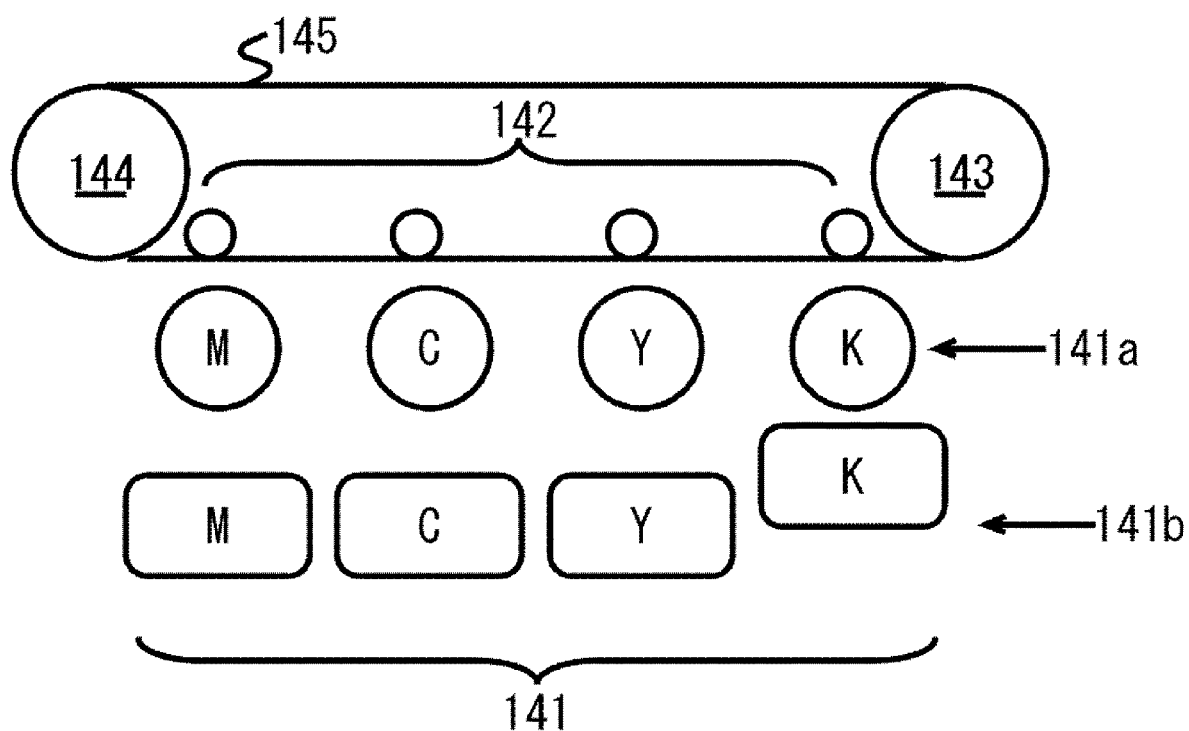
FIG. 4A illustrates the image-forming unit of the MFP in FIG. 1, and is a diagram for explaining the image-forming unit in the case of monochrome printing.

Next, the image-forming unit 141 will be described with reference to FIG. 4A and FIG. 4B. First, FIG. 4A illustrates an image-forming unit 141 in the case of monochrome printing. In other words, the image-forming unit 141 has photosensitive drums 141a for magenta (M), cyan (C), yellow (Y), and black (K), and development-related devices 141b. Incidentally, the development-related devices 141b include a developing device, a charging device, an exposing device, and the like. In addition, the image-forming unit 141 is such that before the start of printing, the photosensitive drums 141a and development-related devices 141b are separated from each other. In other words, before the start of printing, the development-related devices 141b are in a standby state at a position away from the photosensitive drums 141a (printing pre-start position).

Then, as illustrated in FIG. 4, in monochrome printing, as a printing start request from the image-processing unit 117 is issued, the development-related device 141b for black (K) moves to a position approaching a photosensitive drum 141a. In other words, the development-related device 141b for black (K) is moved to the printing start position for developing the toner on the photosensitive drum 141a. On the other hand, as illustrated in FIG. 4B, in color printing, the development-related devices 141*b* corresponding to all colors, that is, each of the development-related devices 141*b* corresponding magenta (M), cyan (C), yellow and black (K) moves to a position approaching the respective photosensitive drum 141*a*. In other words, the development-related devices 141*b* of magenta (M), cyan (C), yellow (Y), and black (K) are moved to the printing start positions for developing the toner on the respective photosensitive drums 141*a*.

Figure 5:
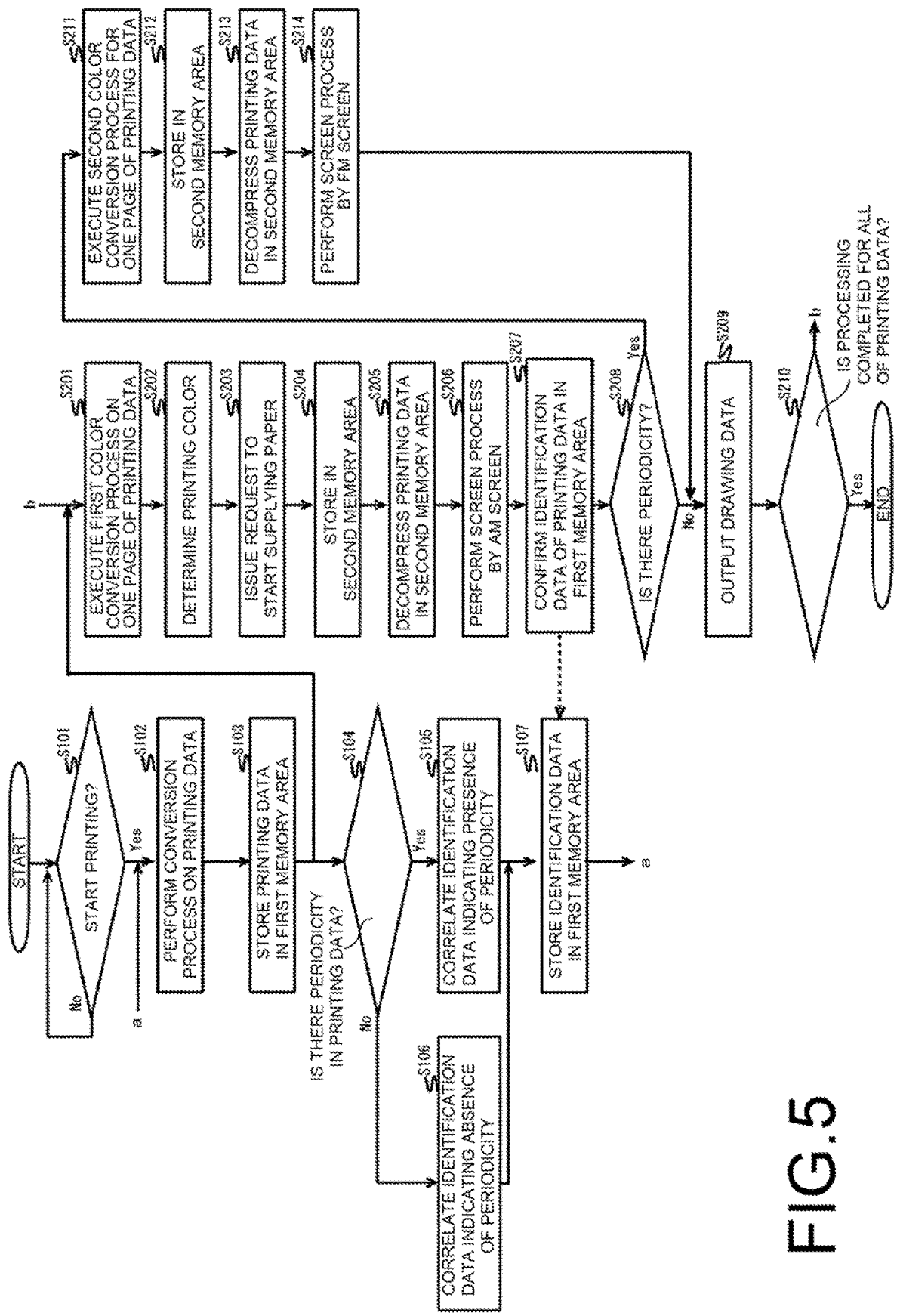
FIG. 5 is a flowchart for explaining an example of image processing by the MFP in FIG. 1.

Next, an example of image processing by the MFP 100 will be described with reference to FIG. 5. Incidentally, in the following description, it is presumed that the image-processing unit 117 performs a screen process by an AM screen for printer printing. Note that in the following, steps S201 to S210 indicate a speculative process in parallel with steps S102 to S107.

<Processing by the Data-Processing Unit 117*a* and Data-Compression Unit 117*b*>

(Step S101)

The system-control unit 120 determines whether printing is started or not.

In this case, when there is no notification indicating that printing start has been selected via the panel unit 104 from the panel-operation-control unit 118, the system-control unit 120 determines that printing is not to be started (step S101: NO).

On the other hand, when there is a notification indicating that printing start has been selected via the panel unit 104 from the panel-operation-control unit 118, the system-control unit 120 determines that printing is to be started (step S101: YES), and the process moves to step S102.

Note that when determining that printing is to be started, the system-control unit 120 instructs the image-processing unit 117 and the printer-control unit 112 to start printing. Moreover, in the case where printing data selected via the panel unit 104 is stored in the HDD 105, the system-control unit 120 reads out the corresponding printing data from the HDD 105 and gives that printing data to the image-processing unit 117.

(Step S102)

The data-processing unit 117*a* of the image-processing unit 117 performs a conversion process on the printing data.

In this case, the data-processing unit 117*a* rasterizes the printing data including characters, images, and the like indicated in an intermediate language, for example, and converts the printing data into bitmap printing data. Incidentally, the data-processing unit 117*a* performs a conversion process on printing data for each one page.

(Step S103)

The data-compression unit 117*b* of the image-processing unit 117 stores the printing data in the first memory area of the RAM 115 and the HDD 105.

In this case, the data-compression unit 117*b* compresses one page of printing data converted by the data-processing unit 117*a*, and stores the one page of compressed printing data in the first memory area of the RAM 115 and the HDD 105.

(Step S104)

The data-compression unit 117*b* of the image-processing unit 117 analyzes the compressed printing data stored in the first memory area of the RAM 115 and determines whether there is periodicity in the image corresponding to the one page of printing data converted by the data processing unit 117*a*.

In this case, when the data-compression unit 117*b* determines that there is periodicity in the image corresponding to the one page of printing data converted by the data-processing unit 117*a* (step S104: YES), the process moves to step S105.

However, in the case where the data-compression unit 117*b* determines that there is no periodicity in the image corresponding to the one page of printing data converted by the data-processing unit 117*a* (step S104: NO), the process moves to step S106.

(Step S105)

The data-compression unit 117*b* of the image-processing unit 117 generates identification data indicating the presence of periodicity and correlates the identification data with the one page of compressed printing data.

(Step S106)

The data-compression unit 117*b* of the image-processing unit 117 generates identification data indicating the absence of periodicity and correlates the identification data with the one page of compressed printing data. Here, the identification data and the printing data may be correlated with each other by including identification information of printing data to be correlated and a code indicating the presence or absence of a periodicity in the identification data indicating the presence or absence of periodicity.

(Step S107)

The data-compression unit 117*b* of the image-processing unit 117 stores the identification data in the first memory area of the RAM 115 and the HDD 105.

<Processing by the Color-Conversion-Processing Unit 117*c*, Data-Decompression Unit 117*d*, Screen-Processing Unit 117*e*, and Data-Output Unit 117*f*>

(Step S201)

The color-conversion-processing unit 117*c* of the image-processing unit 117 executes a first color conversion process on one page of printing data. The first color conversion process is a color conversion process by the printer color table.

In this case, after the completion of the process of step S103, the color-conversion-processing unit 117*c* reads out the one page of compressed print data from the first memory area of the RAM 115, decompresses the bitmap printing data, and executes a color conversion process on that bitmap printing data. At this time, the color-conversion-processing unit 117*c* executes the color conversion process using a printer color table.

(Step S202)

The color-conversion-processing unit 117 *c* of the image-processing unit 117 determines the printing color.

In this case, from the color values of magenta (M), cyan (C), yellow (Y), and black (K) of each pixel of printing data that has undergone a color conversion process using the printer color table, the color-conversion-processing unit 117*c* determines the printing color as either monochrome or color. More specifically, when all of the pixels of the printing data that has undergone the color conversion process are achromatic, the color-conversion-processing unit 117*c* determines that the printing color is monochrome. The achromatic color refers to pixels with only color K and a pixels with the same color value CMY. The color-conversion-processing unit 117*c* determines that the printing color is color when pixels other than achromatic color exist in the printing data that has undergone the color conversion process. Pixels other than achromatic color are, in other words, pixels of a chromatic color.

(Step S203)

The image-processing unit 117 issues a printing start request.

In this case, when the color-conversion-processing unit 117c determines that the printing color is color, the image-processing unit 117 issues a printing start request to the system-control unit 120.

At this time, in the case where the printing color is monochrome, the system-control unit 120 controls the development-related device 141b for black (K) so as to approach the photosensitive drum 141a for black (K) as illustrated in FIG. 4A. In addition, in the case where the printing color is color, the system-control unit 120 performs control so that the respective development-related devices 141b approach the respective photosensitive drums 141a for magenta (M), cyan (C), yellow (Y), and black (K) as illustrated in FIG. 4B. Next, the system-control unit 120 starts a primary paper supply of paper 133 from any one of the paper-supply cassettes 131a to 131c. The drawing data is outputted to the printer-control unit 112 in step S209 described later, and the paper 133 is held in a resist unit in the vicinity of the secondary transfer roller 146 until the secondary paper-supply timing for transferring the image to the paper 133.

(Step S204)

The color-conversion-processing unit 117c of the image-processing unit 117 causes the one page of printing data that has undergone the color conversion process to be stored in a second memory area of the RAM 115.

In this case, the color-conversion-processing unit 117c compresses the one page of printing data that has undergone the color conversion process using the printer color table, and stores the compressed printing data in the second memory area of the RAM 115.

(Step S205)

The data-decompression unit 117d of the image-processing unit 117 reads and decompresses the one page of printing data that has undergone the color conversion process from the second memory area of the RAM 115.

(Step S206)

The screen-processing unit 117e of the image-processing unit 117 performs a screen process by an AM screen.

In this case, the screen-processing unit 117e performs a screen process by the AM screen on the printing data that has undergone the color conversion process and has been decompressed by the data-decompression unit 117d.

Incidentally, steps S201 to S206 and steps S104 to S107 are executed independently of each other.

(Step S207)

The screen-processing unit 117e of the image-processing unit 117 confirms the identification data of the printing data in the first memory area of the RAM 115.

In this case, the screen-processing unit 117e confirms the identification data correlated with the compressed one page of data stored in the first memory area of the RAM 115 by the data-compression unit 117b. This identification data is identification data corresponding to the color-converted printing data that is the object of the screen process in step S201 after completion of the screen process on the printing data that has undergone the color conversion process and is decompressed by the data-decompression unit 117d. Note that the screen processing unit 117e may confirm the identification data during the series of processes in steps S201 to S204. For example, this confirmation may be performed periodically and/or after each step of steps S201 to S204 is completed.

(Step S208)

The screen-processing unit 117e of the image-processing unit 117 determines whether there is periodicity.

In this case, the screen-processing unit 117e confirms the identification data correlated with the compressed one page of data stored in the first memory area of the RAM 115 by the data-compression unit 117b. When it is determined that the identification data indicates that there is no periodicity (step S208: NO), the process moves to step S209. At this time, the screen-processing unit 117e sends the printing data screen-processed by the AM screen to the data-output unit 117f in a later stage.

On the other hand, the screen-processing unit 117e confirms the identification data correlated with the compressed one page of data stored in the first memory area of the RAM 115 by the data compression unit 117b. When it is determined that the identification data indicates that there is periodicity (step S208: YES), the process moves to step S211. At this time, the screen-processing unit 117e instructs the color-conversion-processing unit 117c to perform a re-color conversion process. In addition, the screen-processing unit 117e discards the printing data screen-processed by the AM screen.

In this case, since the color conversion process in the color-conversion-processing unit 117c is performed according to the copy color table, the image-processing unit 117 determines that there is no change in the determination of the printing color by the color-conversion-processing unit 117c, and does not reissue a printing start request to the system control unit 120.

At this time, the system-control unit 120 does not change the positional relationship between the respective photosensitive drums 141a for magenta (M), cyan (C), yellow (Y), and black (K) and the respective development-related devices 141b from that at the end of the process of step S203.

(Step S209)

The data-output unit 117f of the image-processing unit 117 converts the printing data screen-processed by the screen-processing unit 117e into final drawing data and outputs the data.

(Step S210)

The image-processing unit 117 determines whether or not the process is completed for all of the printing data.

Here, in the case where the image-processing unit 117 determines that the processing for all of the printing data has not been completed (step S210: NO), the process moves to step S102.

On the other hand, in the case where the image-processing unit 117 determines that the processing for all of the printing data has been completed (step S210: YES), processing ends.

(Step S211)

The color-conversion-processing unit 117c of the image processing unit 117 executes a second color conversion process on the one page of printing data. The second color conversion process is a color conversion process using the copy color table.

In this case, the color-conversion-processing unit 117c reads out the compressed one page of printing data from the first memory area of the RAM 115, decompresses the bitmap printing data, and executes a color conversion process on that bitmap printing data. At this time, the color-conversion-processing unit 117c executes the color conversion process using the copy color table.

(Step S212)

The color-conversion-processing unit 117c of the image-processing unit 117 causes the one page of printing data that has undergone the color conversion process to be stored in a second memory area of the RAM 115.

In this case, the color-conversion-processing unit 117c compresses the one page of printing data that has undergone the color conversion process using the copy color table, and stores the compressed printing data in the second memory area of the RAM 115.
(Step S213)

The data-decompression unit 117d of the image-processing unit 117 reads and decompresses the one page of printing data that has undergone the color conversion process from the second memory area of the RAM 115.
(Step S214)

The screen-processing unit 117e of the image-processing unit 117 performs a screen process using a FM screen.

In this case, the screen-processing unit 117e performs a screen process by the FM screen on the printing data that has been decompressed by the data-decompression unit 117d and that has undergone the color conversion process.

After completion of the screen process, the process moves to step S209.

As described above, in the present embodiment, the image-processing unit 117 performs image processing on printing data (first printing data), the RAM 115 (storage device) stores printing data (second printing data) that has undergone image processing by the image-processing unit 117, and the printer unit 140 performs printing based on the printing data (second printing data) stored by the storage device. Moreover, in the image-processing unit 117, the data-processing unit 117a (first data-processing unit) converts printing data (first printing data) into bitmap printing data (third printing data); the data-compression unit 117b (second data-processing unit) analyzes the printing data (third printing data), stores the obtained identification data indicating the presence or absence of periodicity in the first memory area of the RAM 115 (storage device), and correlates the identification information with the printing data (third printing data); the color-conversion-processing unit 117c that performs a speculative process in parallel with processing by the data-compression unit 117b (second data-processing unit) stores printing data (fourth printing data) obtained by performing a color conversion process corresponding to printer printing on printing data (third printing data) in the second memory area of the RAM 115 (storage device); the screen-processing unit 117e (second data-processing unit) that performs a speculative process in parallel with processing by the data-compression unit 117b (second data-processing unit) performs an AM screen process on the printing data (fourth printing data); and the data-output unit 117f converts the printing data screen-processed by the screen-processing unit 117e into final drawing data, and outputs that final drawing data as printing data (second printing data). In addition, the screen processing unit 117e confirms the identification data stored in the first memory area of the RAM 115 (storage device) by the data-compression unit 117b (second data-processing unit), and in the case where the identification data indicates the presence of periodicity, instructs the color-conversion-processing unit 117c to perform a color conversion process corresponding to copy printing on the printing data (third printing data), and perform a FM screen process on the printing data on which a color conversion process corresponding to copy printing has been performed. Furthermore, the system-control unit 120 moves the image-forming unit 141 from the printing pre-start position to the printing start position based on the determination result of the printing color in the color conversion process corresponding to printer printing by the color-conversion-processing unit 117c, however, does not control movement based on the determination result of the printing color in the re-color conversion process corresponding to copy printing by the color-conversion-processing unit 117c.

In this way, the color conversion process for suppressing the occurrence of moire can be executed. In addition, the data-processing unit 117b (second data-processing unit) performs a process for analyzing the printing data (third printing data) converted by the data-processing unit 117a (first data-processing unit). In parallel with this, the color conversion process by the color-conversion-processing unit 117c, and the screen process by the screen-processing unit 117e are speculatively processed. As a result, the screen process can be executed simultaneously with the process of analyzing the printing data (third printing data) by the data-compression unit 117b (second data-processing unit). Furthermore, the system-control unit 120 moves the image-forming unit 141 from the printing pre-start position to the printing start position based on the determination result of the printing color in the color conversion process corresponding to the first printer printing of the color-conversion-processing unit 117c by the speculation process. As a result, since the position control of the image-forming unit 141 can be performed earlier, it is possible to suppress the deterioration of the performance of the processing up to the completion of printing while suppressing the occurrence of moire.

Incidentally, a case where the screen-processing unit 117e performs confirmation of the identification data in step S207 during the series of processes in steps S201 to S206 will be described. (1) When the identification data correlated with the compressed one page of printing data indicates that there is no periodicity, the data compression unit 117b may delete the compressed one page of printing data from the first memory area of the RAM 115 after completion of the color conversion process in step S201. (2) When the identification data correlated with the compressed one page of printing data indicates that there is periodicity, the data compression unit 117b may delete the compressed one page of printing data from the first memory area of the RAM 115 after completion of the color conversion process in step S211.

A case in which the screen-processing unit 117e confirms the identification data in step S207 during the series of processes in steps S201 to S206 will be described. When the identification data correlated with the compressed one page of printing data indicates the presence of periodicity, the process being executed in steps S201 to S206 may be canceled and the process may move to step S207.

A case in which the data-compression unit 117b determines in step S104 that there is periodicity in the one page of printing data converted by the data-processing unit 117a will be described. The data-compression section 117b may instruct the processing unit (color-conversion-processing unit 117c or screen-processing unit 117e) that is executing a process of the steps S201 to S206 to cancel the process, the processing unit given the instruction may cancel the process being executed, and the process may move to step S211. In this case, the processes of steps S105 to S107 may be deleted from the processing flow.

In addition, in step S104, the data-compression unit 117b of the image-processing unit 117 may analyze the compressed printing data stored in the first memory area of the HDD 105. In this case, regardless of the process of confirming identification data in step S207, after the color conversion process in step S201 is completed, the data-compression unit 117b may delete the compressed one page of printing data from the first memory area of the RAM 115. In this case, in step S209, the color-conversion-processing unit 117c may read the compressed one page of printing data from the first memory area of the HDD 105 and execute the color conversion process, and output the image data.

In addition, in step S207, the screen-processing unit 117e may confirm the identification data of the printing data in the first memory area of the HDD 105.

Moreover, in step S107, the data-compression unit 117b may store the identification data in one of the preset first memory areas of the RAM 115 and the HDD 105. In this case, in step S207, the screen-processing unit 117e confirms the identification data of the printing data in the first memory area of the storage device of the RAM 115 and the HDD 105 that stores the identification data.

In the image forming apparatus of the typical technique described above, since the control unit switches the image processing method of the image data to be overwritten on the original document based on the image data of the original document, the moire phenomenon generated when forming the image by overwriting on the original document can be suppressed.

Incidentally, an image forming apparatus capable of color printing is equipped with an image-forming unit that includes a photosensitive drum and development-related devices corresponding to each of magenta (M), cyan (C), yellow (Y), and black (K). Here, the development-related devices include a developing device, a charging device, an exposing device, and the like. In addition, the image-forming unit constitutes a part of a printing engine. Before the start of printing, the development-related devices are in a standby state at positions separated from each photosensitive drum of the image-forming unit. Then, in the case where monochrome printing is performed, the development-related device is brought close to the photosensitive drum for black (K). On the other hand, in the case where color printing is performed, all of the development-related devices are brought close to all of the photosensitive drums.

In other words, from the aspect of product life, the image-forming unit causes only development-related devices corresponding to the printing color approach the photosensitive drums. Moreover, the printing color is generally determined when the color conversion process for the printing data by the image-processing unit is completed.

Therefore, as in the case of an image forming apparatus of the above-described typical technology, when the control unit switches the image processing method of the image data to be overwritten on the original document based on the image data of the original document, the printing color is not determined until the switched image processing is completed. Therefore, the position control of the image-forming unit is delayed, and there is a problem in that the performance of processing up to the completion of printing may become degraded.

Taking the above situation into consideration, an object of the technique according to the present disclosure is to provide an image forming apparatus and a recording medium capable of solving the above-described problems.

With the image forming apparatus and the recording medium according to the present disclosure, a color conversion process for suppressing the occurrence of moire can be executed. Moreover, a screen process can be executed at the same time as the process of determining the presence or absence of the periodicity of an image corresponding to the third printing data by a second data-processing unit. Furthermore, position control by an image-forming unit can be performed earlier. Therefore, it is possible to suppress degradation in performance of processing up to completion of printing while suppressing the occurrence of moire.

In the image forming apparatus and the recording medium according to the present disclosure, the second data-processing unit performs a process of determining the periodicity of an image corresponding to the third printing data converted by the first data-processing unit. In parallel with this, a color conversion process corresponding to printer printing by the color-conversion-processing unit and a screen process using an AM screen by the screen-processing unit are speculatively processed. As a result, it is possible to prevent a delay in printing of printing data that does not cause moire.

Moreover, it is possible to execute a color conversion process corresponding to copy printing by the color-conversion-processing unit for suppressing the occurrence of moire on the third printing data that is the same as the printing data that has undergone a color conversion process corresponding to printer printing.

What is claimed is:
1. An image forming apparatus comprising:
an image-processing unit that performs image processing on first printing data;
a storage device for storing second printing data that has undergone the image processing on the first printing data by the image-processing unit;
a printer unit as a printer having an image-forming unit for performing printing based on the second printing data stored in the storage device; and
a system-control unit that controls a moving of the image-forming unit between a printing pre-start position and a printing start position,
wherein the image-processing unit has:
a first data-processing unit that converts the first printing data into bitmap third printing data;
a second data-processing unit that determines whether or not the bitmap third printing data has a periodicity of an image;
a color-conversion-processing unit that, by a speculative process in parallel with a process by the second data processing unit, generates fourth printing data that has undergone a color conversion process corresponding to a printer printing on the third printing data;
a screen-processing unit that, by the speculative process in parallel with the process by the second data processing unit, performs an AM screen process on the fourth printing data; and
a data-output unit for outputting the printing data screen-processed by the screen-processing unit to the printer unit as the second printing data,
wherein
the screen-processing unit:
a) in the case where it is determined by the second data-processing unit that the bitmap third printing data does not have the periodicity of the image, sends printing data screen-processed by the AM screen process to the data-output unit; and
b) in the case where it is determined by the second data-processing unit that the bitmap third printing data has the periodicity of the image, i) instructs the color-conversion-processing unit to perform a re-color conversion process corresponding to a copy printing on the third printing data, ii) discards the printing data screen-processed by the AM screen process, and iii) performs an FM screen process on the forth printing data on which the re-color conversion process corresponding to the copy printing has been performed,
wherein the color-conversion-processing unit determines a printing color based on the fourth printing data that has undergone the color conversion process corresponding to the printer printing by the color-conversion processing unit, and wherein the system-control unit:
a) controls the moving of the image-forming unit corresponding to the printing color from the printing pre-start position to the printing start position based on the fourth printing data that has undergone the color conversion process corresponding to the printer printing by the color-conversion-processing unit; and
b) does not control the moving of the image-forming unit corresponding the printing color based on the fourth printing data that has undergone the re-color conversion process corresponding to the copy printing by the color-conversion-processing unit.

2. The image forming apparatus according to claim 1, wherein
the color-conversion-processing unit determines whether the printing color is monochrome or color; and
the system-control unit causes the image-forming unit for black to move from the printing pre-start position to the printing start position in the case where the printing color is monochrome, and causes the image-forming units corresponding to all colors to move from the printing pre-start position to the printing start position in the case where the printing color is color.

3. A non-transitory computer-readable recording medium for storing an image forming program executable on a computer for controlling an image forming apparatus, and the computer functions as, when executing the image forming program:
an image-processing unit for performing image processing on first printing data;
a printer unit for performing printing based on second printing data stored in a storage device of the image forming apparatus, the second printing data having undergone the image processing on the first printing data by the image-processing unit; and
a system-control unit that controls a moving of the image-forming unit between a printing pre-start position and a printing start position,
wherein the image-processing unit has:
a first data-processing unit for converting the first printing data into bitmap third printing data;
a second data-processing unit for determining whether the bitmap third printing data has a periodicity of an image or not;
a color-conversion-processing unit for, by a speculative process in parallel with a process by the second data processing unit, generating fourth printing data that has undergone a color conversion process corresponding to a printer printing on the third printing data;
a screen-processing unit for, by the speculative process in parallel with the process by the second data processing unit, performing an AM screen process on the fourth printing data; and
a data-output unit for outputting the printing data screen-processed by the screen-processing unit to the printer unit as the second printing data,
wherein the screen-processing unit:
a) in the case where it is determined by the second data-processing unit that the bitmap third printing data does not have the periodicity of the image, sends printing data screen-processed by the AM screen process to the data-output unit; and
b) in the case where it is determined by the second data-processing unit that the bitmap third printing data has the periodicity of the image, i) instructs the color-conversion-processing unit to perform a re-color conversion process corresponding to a copy printing on the third printing data, ii) discards the printing data screen-processed by the AM screen process, and iii) performs an FM screen process on the forth printing data on which the re-color conversion process corresponding to the copy printing has been performed,
wherein the color-conversion-processing unit determines a printing color based on the fourth printing data that has undergone the color conversion process corresponding to the printer printing by the color-conversion processing unit, and
wherein the system-control unit:
a) controls the moving of the image-forming unit corresponding to the printing color from the printing pre-start position to the printing start position based on the fourth printing data that has undergone the color conversion process corresponding to the printer printing by the color-conversion-processing unit; and
b) does not control the moving of the image-forming unit corresponding the printing color based on the fourth printing data that has undergone the re-color conversion process corresponding to the copy printing by the color-conversion-processing unit.

* * * * *